United States Patent [19]

Selander et al.

[11] 4,423,571
[45] Jan. 3, 1984

[54] QUICK CHANGE SHOE ASSEMBLY FOR STRAIGHT LINE SANDER

[76] Inventors: Karl W. Selander, 2425 Wildwood Dr., Glendora, Calif. 91740; John J. Smay, 14104 E. MacVista, Whittier, Calif. 91602

[21] Appl. No.: 279,591

[22] Filed: Jul. 1, 1981

[51] Int. Cl.³ .............................................. B24B 23/00
[52] U.S. Cl. ............................. 51/170 TL; 51/170 R; 51/395; 51/396
[58] Field of Search .............. 51/170 TL, 170 R, 396, 51/395, 397, 398, 400; 30/279, 123.5; 29/81 H; 15/197; 99/591, 623

[56] References Cited

U.S. PATENT DOCUMENTS

| | | | |
|---|---|---|---|
| 1,799,562 | 4/1931 | Kurtz et al. | 51/396 X |
| 2,689,436 | 9/1954 | Wagner | 51/170 TL |
| 4,023,572 | 5/1977 | Weigand et al. | 30/279 R X |
| 4,091,576 | 5/1978 | Hutchins | 51/170 TL |

Primary Examiner—E. R. Kazenske
Assistant Examiner—Willmon Fridie, Jr.
Attorney, Agent, or Firm—Spensley, Horn, Jubas & Lubitz

[57] ABSTRACT

A quick change shoe assembly for use with a pneumatic straight line sander or orbital sander is disclosed comprising a base which is fixedly secured to the movable plate of such a sander by conventional bolts and a sanding or filing shoe having attachment means for attaching the shoe to the base, the shoe being removable therefrom without the use of tools and without necessitating the removal of the base from the movable plate.

12 Claims, 13 Drawing Figures

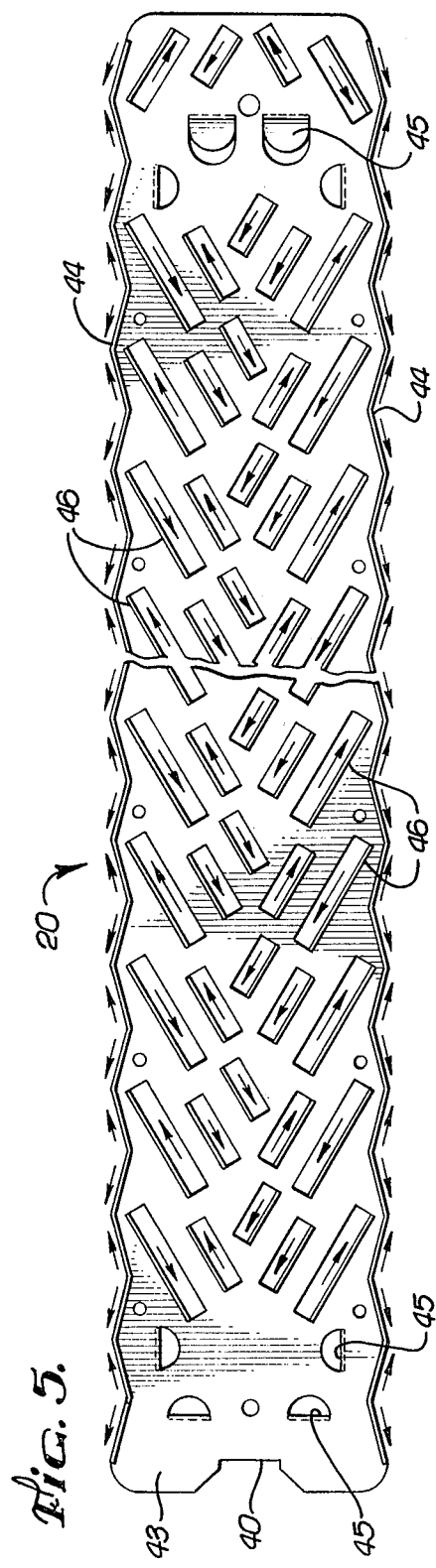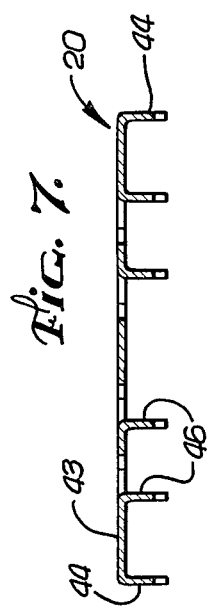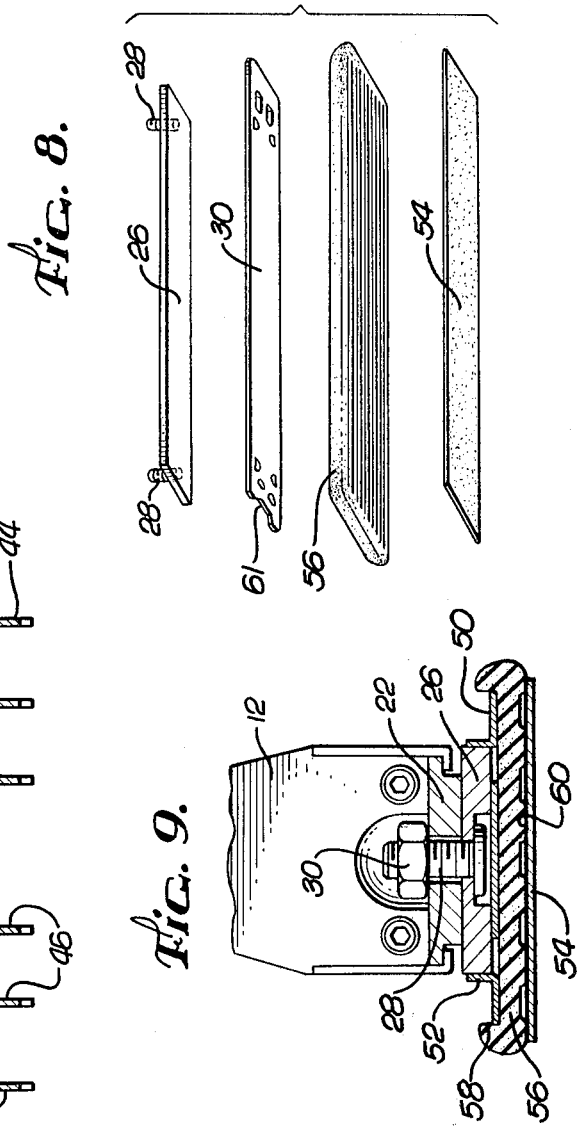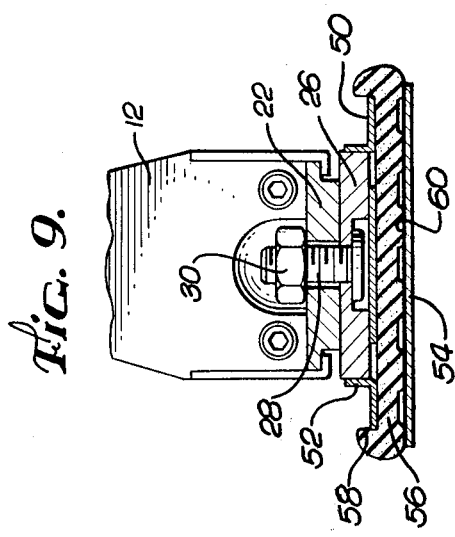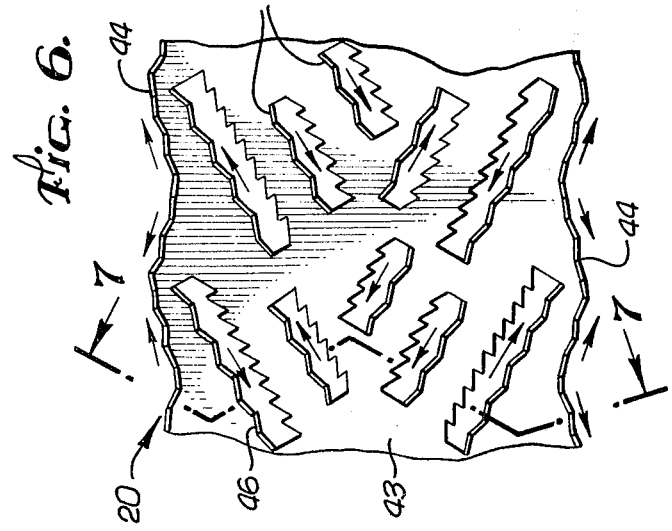

QUICK CHANGE SHOE ASSEMBLY FOR STRAIGHT LINE SANDER

BACKGROUND OF THE INVENTION

1. Field of the Invention

This invention relates to pneumatic straight line sanders and orbital sanders and more particularly to a quick change sanding or filing shoe assembly for attachment thereto and which may also be used separately by hand.

2. Prior Art

Pneumatic straight line sanders and orbital sanders are well known in the art. Such straight-line sanders generally comprise a pneumatic mechanism for continually moving a sanding shoe or file linearly back and forth.

The sanding shoe or file used with such a device is approximately two and one-half inches wide by fifteen or sixteen inches long and is affixed to a movable plate of the pneumatic mechanism by two bolts set approximately thirteen inches apart. Pursuant to the prior art designs, the sanding or filing shoe is directly bolted to the plate of the sander. As a result, it is difficult and time consuming to remove the shoe presently being used and replace it with a different shoe. Thus, it is very difficult to perform any radius work with such a device.

These problems are of special concern in the automotive industry, such as during body repair, typically, filing and sanding shoes must be interchanged a number of times before a repair job is ready for painting. Each time one shoe needs to be replaced bolts must be removed, a new shoe attached and bolts replaced. There is also the problem of forming curves. In many prior art devices, the stiffness of the filing/sanding shoe make accurately formed curves very difficult to achieve.

Further, the prior art files used with these devices are generally configured such that when used, gouging results along straight line edges. There may be also incomplete and non-uniform cutting, and clogging of the cutting teeth with the material being filed. Of course, each of these disadvantages results in inefficient and sloppy work.

BRIEF SUMMARY OF THE INVENTION

It is therefore an object of this invention to provide a means for permitting the quick change of a sanding or filing shoe on a straight line or orbital pneumatic sander.

It is a further object of this invention to provide a quick change means as described above which is adaptable for use with any standard straight line sander.

It is yet another object of this invention to provide a quick change means as described above which may be used with either a sanding shoe or a filing shoe.

It is still another object of this invention to provide an improved design for a filing shoe for use with a quick change means described above.

A typical straight line pneumatic sander has a movable plate which moves back and forth along its longitudinal axis. Disposed near the ends of the plate are a pair of holes spaced approximately thirteen inches apart. These holes are configured to receive upwardly extending bolts from the sanding or filing shoe as are presently known in the art. The shoe is thus secured to the plate and moves longitudinally with the plate.

With the prior art devices, the sanding or filing shoe is secured directly to the movable plate and thus, in order to change shoes, one has to loosen the nuts securing the bolts and remove the bolts from the holes in the movable plate. This is always time consuming and frequently difficult.

Pursuant to the present invention, rather than securing the shoe directly to the movable plate, a generally rectangular base is fixedly secured to the plate. This base may be secured, as with the prior art shoes, by a pair of bolts extending upwardly through the holes in the plate. The ends of the base extend slightly beyond the ends of the plate. There are then provided sanding or filing shoes with clipping means disposed on the top surfaces thereof such that the shoes may be clipped directly to the base at each end thereof. The clipping means are configured to permit the quick and simple attachment and detachment of the shoe to the base.

The sanding and filing shoes may be similar to those known in the art except that they are configured to be releasably clipped to the base of the present invention rather than bolted directly to the plate of the sander. In addition, the file may have the following improved design. The file may have teeth which cover the entire surface thereof, and have curved edges so that there is no cutting ridge and no gaps. It may be made from one piece of metal and not several different pieces, and have teeth disposed at different angles in a predetermined pattern and which are angled in both longitudinal directions. Finally, the file may have staggered teeth which broadens the area of cutting and has the beneficial result that the teeth will not fill up with metal or wood while in use. It is believed that no prior art filing shoe combines all of the above described features or has all of the benefits of the present invention.

The novel features which are believed to be characteristic of the invention, both as to its configuration and method of operation, together with further objectives and advantages thereof, will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

BRIEF DESCRIPTION OF THE DRAWINGS

FIG. 5 is a schematic bottom plan view of the improved filing shoe of the present invention.

FIG. 6 is a partially cutaway bottom plan view of the improved filing shoe of the present invention.

FIG. 7 is a cross-sectional view of the improved filing shoe of the present invention taken along lines 7—7 of FIG. 6.

FIG. 8 is an exploded view of the quick change base and sanding shoe of the present invention.

FIG. 9 is a cross-sectional view showing the quick change sanding shoe assembly of the present invention as used with a straight line sander.

DETAILED DESCRIPTION OF THE PREFERRED EMBODIMENT

Figure 1:
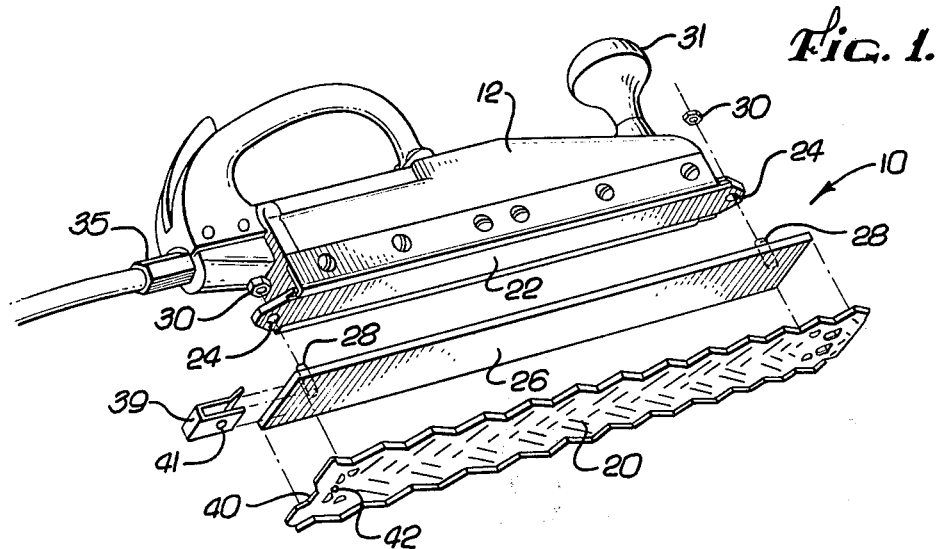
FIG. 1 is a perspective, partially exploded view of the quick change filing shoe assembly of the present invention as used with a pneumatic straight line sander.
Figure 2:
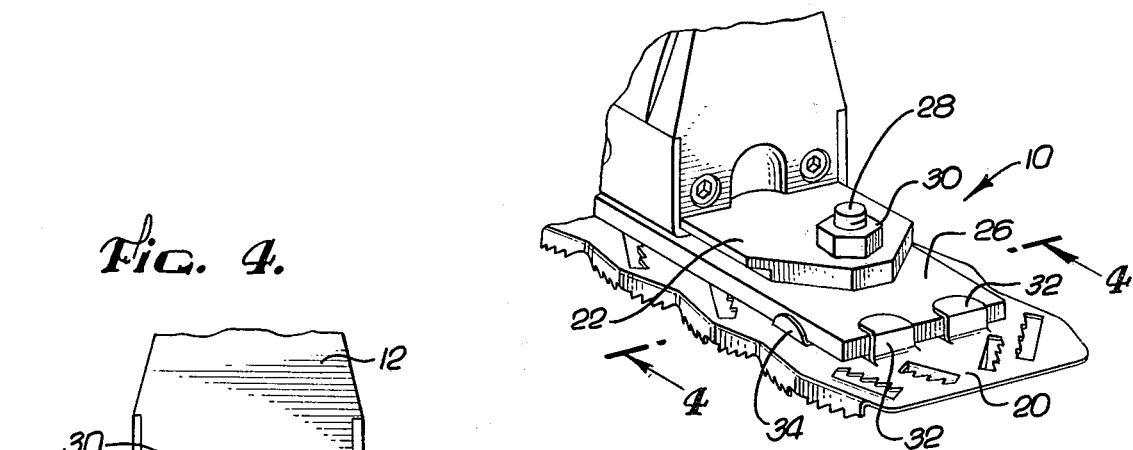
FIG. 2 is a closeup perspective view thereof showing the detailed aspects of the invention.
Figure 4:
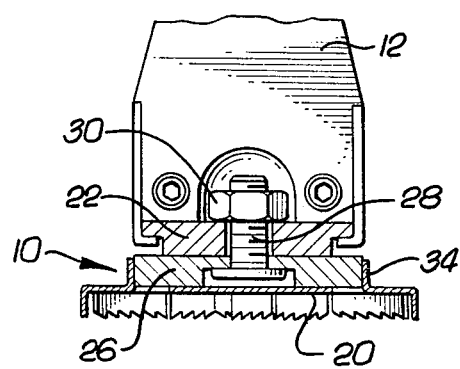
FIG. 4 is a cross-sectional view of the quick change filing shoe assembly of the present invention taken along lines 4—4 of FIG. 2.
Figure 3:
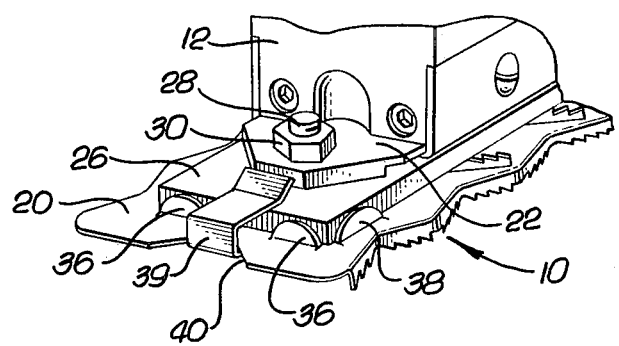
FIG. 3 is a closeup perspective view of the opposing end to the end shown in FIG. 2 of the quick change filing shoe assembly of the present invention.

Referring first to FIGS. 1-4, there is shown the quick change shoe assembly 10 for use with a pneumatic straight line sander 12 showing the use of a filing shoe 20 therewith.

Straight line sanders 12 such as is shown in the figures, are well known in the art. Such straight line sanders 12 have a movable plate 22 disposed at the bottom thereof. The movable plate 22 moves back and forth along its longitudinal axis. Disposed near each end of the movable plate 22 is a pair of holes 24 through which a bolt may be disposed. In the prior art systems, a bolt on each end of the filing or sanding shoe would extend through each of said holes 24, thereby securing the filing or sanding shoe directly to the movable plate 22.

Pursuant to the present invention, however, there is provided a base 26. The base 26 is generally rectangular in area and cross-section and is approximately the same width as the movable plate 22 of the straight line sander 12. The length of the base 26 is slightly longer than that of the movable plate 22. Extending upwardly from the top surface of the base 26 are a pair of bolts 28. The bolts 28 are spaced such that they may pass through the holes 24 in the movable plate 22. The current standard spacing between such holes 24 is approximately thirteen inches. The distance may be altered to accommodate any straight line sander. A pair of nuts 30 are then disposed over the ends of the bolts 28 which extend through the holes 24 in the movable plate 22. The base 26 is thereby secured to the movable plate 22. The ends of the base 26 extend slightly beyond the ends of the movable plate 22.

There is also provided a filing shoe 20 which is quickly and easily attached to or removed from the base 26. The means for attaching the filing shoe 20 to the base 26 may be as follows. At the front end of the filing shoe 20 nearest the knob 31, and extending upwardly therefrom are disposed a pair of L-shaped projections 32. This is perhaps best seen with reference to FIG. 2. These projections are configured to snugly receive one end of the base 26 and thereby secure the base 26 from vertical or horizontal movement. Disposed inwardly of said projections 32 and also extending upwardly from the filing shoe 20 are a pair of flaps 34. Each of the flaps 34 is disposed in a plane perpendicular to both legs of each projection 32. The flaps 34 are also spaced apart such that the sides of the base 26 fit snugly between the flaps 34 thereby securing the base 26 from sideways motion. Thus, one end of the filing shoe 20 may be secured to the base 26 by inserting the base 26 between the flaps 34 and into the projections 32.

The rear end of the filing shoe 20, nearest the air inlet 35, (see FIGS. 1 and 3) is preferably secured to the base 26 by pushing the base 26 into a friction fit relationship with a number of flaps disposed in the other end of the filing shoe 20. At the opposing end of the filing shoe 20 there are disposed two end flaps 36 which are generally parallel to the upwardly extending legs of the projections 32. Also, the end flaps 36 are spaced from the projections 32 such that the base 26 is snugly fit therebetween. Generally adjacent and perpendicular to each end flap 36 is a side flap 38. The side flaps 38 are spaced apart such that the sides of the base 26 fit snugly therebetween, thereby frictionally securing the base 26 from sideways movement.

The rear end of the filing shoe 20 is further secured to the base 26 by a clip 39 having two legs configured to pinch the rear end of the filing shoe 20 and the base 26 therebetween. There is also provided a notch 40 in the end of the filing shoe 20 so that the clip 39 may be inserted therein without extending beyong the edge of the filing shoe 20. There is a dimple 41 extending inwardly from one of the legs of the clip 39. The dimple 41 is positioned so that it will engage a hole 42 in the filing shoe 20, thereby securing the clip 39.

The notch 40 permis the clip 39 to be inserted close to the base 26 without extending upwardly and rearwardly toward the operator's hands and arms. Thus, there is a reduced danger of injury due to being struck by the clip 39 while the device is being operated.

Thus, the filing shoe 20 may be easily attached to the base 26 and to movable plate 22 or removed therefrom without the necessity of screwing nuts onto or off of bolts 28. The changing operation can therefore be performed without the use of tools and in a very short time.

Referring now to FIGS. 5, 6 and 7, there is shown the improved design of the filing shoe 20 which may be used with the present invention. The filing shoe 20 is preferably formed completely out of a single piece of sheet metal 43. This is done by partially punching out the teeth and flap areas. By forming the filing shoe 20 out of a single piece of sheet metal 43, and not from a number of pieces as is often done in the prior art, the filing shoe 20 is much stronger and less likely to break under the extreme stresses inherent in its use. Also, the toothed area of the filing shoe 20 covers the entire bottom surface of the filing shoe 20. Further, the filing shoe 20 of the present invention has curved edges 44. As a result, there is no cutting ridge as that which results from a straight edge nor are there any gaps in the cutting area.

The configuration of the cutting teeth also contributes to the improved performance of the improved filing shoe 20 of the present invention. The teeth 46 of the filling shoe 20 are angled in opposing directions as indicated in the figures by the arrows. The result is that the filing shoe 20 of the present invention cuts equally well in both directions. The teeth 46 in the present invention are also staggered. This broadens the area of cutting makes for uniform complete cutting, and results in the additional benefit that the teeth 46 and the area between the teeth 46 are less likely to fill up with metal or wood as it is being cut.

Furthermore, the angles of the teeth 46 and the edges 44 are very important to the operation of the device. It has been found that optimum cutting efficiency with a minimum of gouging will result when the teeth 46 are angled approximately 25 degrees to 35 degrees, preferably 30 degrees, away from the longitudinal axis of the filing shoe 20 and the edges 44 are angled from approximately 5 degrees to 15 degrees away from the longitudinal axis. It is believed that there is no prior art filing shoe currently available which combines the features described herein above or has the benefits also described.

Further under the present design, the filing shoe 20 is provided with flaps 45 for use with a base 26 and a quick change assembly 10 as described above.

Referring next to FIGS. 8 and 9, there is shown the quick change assembly 10 as used with a sanding shoe 50 as opposed to a filing shoe 20. As used with a sanding shoe 50, the base 26 with the bolts 28 is the same as described above and shown in FIGS. 1 through 4. The base 26 similarly is secured to movable plate 22 by means of bolts 28 and nuts 30.

The sanding shoe 50 is configured to be useable with such a base 26 just as is the filing shoe. As described above with respect to the filing shoe 20, the sanding shoe 50 has a number of flaps 52 configured to secure the sanding shoe 50 to the base 26. There is also provided a clip as described above with respect to the filing shoe. The clip further secures the rear end of the sanding shoe 50 to the base 26. There is also a notch 61 in the sanding shoe 50 into which the clip is inserted so that it does not extend rearwardly, risking injury when the device is in use.

The sanding shoe generally comprises a flat rectangular piece of sheet metal with the flaps 52 extending upwardly therefrom. For use with sandpaper 54 there may be provided a rubber pad 56. The rubber pad 56 is secured to the bottom of the sanding shoe 50 either by glue or by friction as the edges of the sanding shoe 50 are pinched between upwardly extending ridges 58 about the edges of the rubber pad 56. The ridges 58 serve the dual purpose of securing the rubber pad 56 to the sanding shoe 50 and also protecting the user from the sharp edge of the sanding shoe 50. The bottom surface of the rubber pad 56 may also have longitudinal ribs 60, which ribs 60 have the advantage that the sandpaper secured thereto tends to last longer than when a rubber pad without ribs is used. The sandpaper 54 is then secured to the rubber pad 56 by means of adhesive or other conventional fastening means such as a clip. Of course, the sandpaper 54 may be secured directly to the sanding shoe 50 without the use of a rubber pad 56.

Also, the front end of the sanding shoe 50 extends beyond the base 26 to provide further flexibility and better front end clearance. This flexibility on the sides and front allows for a certain degree of radius work which is very difficult with many designs of the prior art. This is especially valuable when working on contoured surfaces to avoid gouging.

Figure 10:
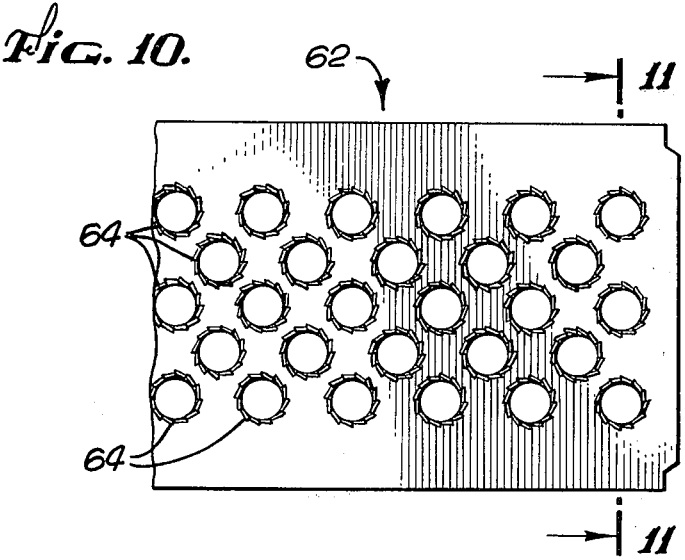
FIG. 10 is a partial bottom plan view of an alternate embodiment of the improved filing shoe of the present invention.
Figure 11:
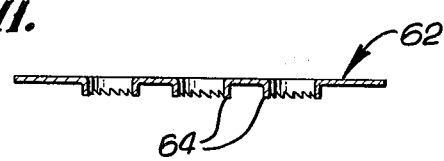
FIG. 11 is a cross-sectional view taken along line 11—11 of FIG. 10.

FIGS. 10 and 11 show an alternate embodiment of the filing shoe 62 according to the present invention. This embodiment of the filing shoe 62 has numerous circular toothed projections 64 depending therefrom. These toothed projections 64 are formed by stamping out a solid piece of sheet metal just as with the embodiment of the filing shoe 20 described above. Also, this embodiment of the filing shoe 62 is secured to the base by flaps and a clip, not shown, which are just like those described with respect to the filing shoe 20. This embodiment of the filing shoe 62 is particularly suitable for use with conventional orbital sanders.

Figure 12:
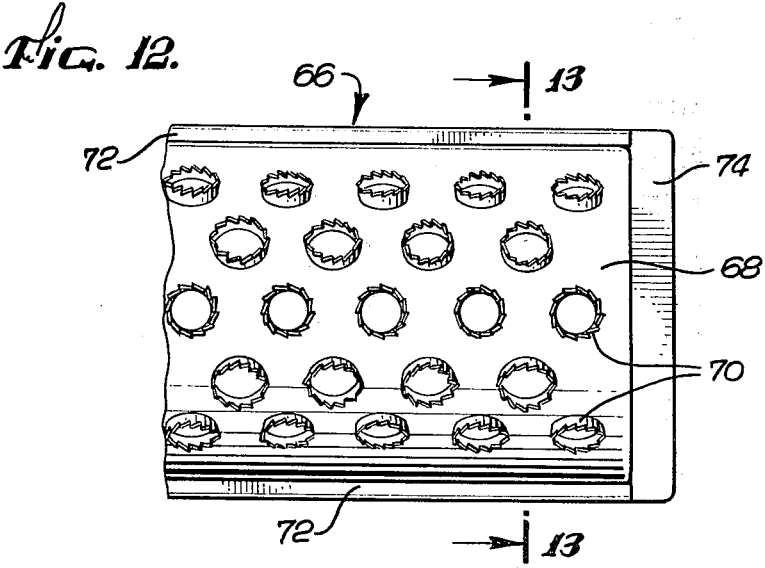
FIG. 12 is a partial bottom plan view of a half-round embodiment of the improved filing show of the present invention.
Figure 13:
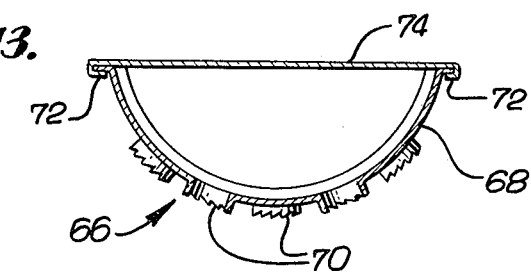
FIG. 13 is a cross-sectional view taken along line 13—13 of FIG. 11.

Referring next to FIGS. 12 and 13, there is shown yet another embodiment of the filing shoe 66 according to the present invention. This embodiment of the filing shoe 66 comprises a piece of sheet metal 68 having a series of circular toothed projections 70 depending therefrom. These toothed projections 70 are formed just as are the projections 64 in the embodiment of the filing shoe 62 described above.

In the embodiment of the filing shoe 66 shown in FIGS. 12 and 13, the piece of sheet metal 68 is curved in a semicircle to form a semicylinder. The ends of the piece of sheet metal 68 are secured by flanges 72 disposed along the edges of a flat metal stip 74 thereby holding the piece of sheet metal 68 in a semicylindrical configuration.

The flat metal strip 74 is provided with a notch and flaps similar to those of the previously described embodiments of the filing shoe 20 and 62 so that the flat metal stip 74 may be secured to the base and may also be clipped thereto.

The design of the present invention allows the quick and easy transition from the use of a filing shoe 20 to a sanding shoe 50 and vice versa. The base 26 may be used with either shoe or any other type of shoe which may be used with a pneumatic straight line sander or orbital sander. The result is a marked increase in efficiency and ease of use.

While a wide variety of materials, shapes and other configurations can be used in this invention, it should be understood that changes can be made without departing from the spirit or scope thereof. For example, the sanding shoe and each of the embodiments of the filing shoe may be used by hand with a base, separate from a pneumatic device. This invention, therefore, is not to be limited to the specific embodiments discussed and illustrated herein.

I claim:

1. A quick change shoe assembly for use with a sanding and filing apparatus having a movable plate comprising:
    a base which is configured to be fixedly secured to said movable plate;
    a shoe having a substantially rigid member and a working surface carried by the rigid member, said rigid member having a plurality of substantially rigid vertical flaps spaced to receive the base and secure the shoe against lateral movement of the shoe relative to the base, said flaps extend upwardly from the top surface of said shoe and are configured to frictionally secure the edges of said base therebetween; and
    a clip adapted to engage the base and secure the shoe member against vertical movement relative to the base; wherein the shoe is removable from the base without the use of tools and without removing said base from said movable plate.

2. A shoe assembly according to claim 1 wherein said base is slightly longer than said movable plate.

3. A shoe assembly according to claim 1 wherein at least on of said flaps is generally L-shaped with a horizontal leg of said flap configured to frictionally secure said base between said leg and to the top surface of said shoe.

4. A shoe assembly according to claim 1 or 3 wherein said clip has two legs configured to secure said base to said shoe.

5. A shoe assembly according to claim 4 wherein said shoe has a notch disposed in one end thereof and said clip is configured to be inserted into said notch while securing said base to said shoe.

6. A shoe assembly according to claim 1 wherein on end of said shoe extends beyond the end of said base.

7. A shoe assembly according to claim 1 wherein said shoe further comprises a rubber pad disposed between said rigid member and a piece of sandpaper.

8. A shoe assembly according to claim 7 wherein said rubber pad has upwardly extending ridges about the circumference thereof, said ridges being configured to overlap the edges of said rigid member.

9. A shoe assembly according to claim 8 wherein said rubber pad has longitudinal ribs on the bottom surface thereof.

10. A shoe assembly according to claim 1 wherein said rigid member has a plurality of teeth depending therefrom.

11. A shoe assembly according to claim 10 wherein said teeth are set at differing angles in a predetermined pattern and said teeth are variously angled in opposing directions such that the cuttng patterns of said shoe is uniform and said teeth do not become clogged with shavings while in use.

12. A quick change shoe assembly for use with a sanding and filing apparatus having a movable plate, comprising:

a generally rectangular base of length slightly longer than said movable plate configured to be secured to said movable plate;

a shoe having a rigid member which has a plurality of rigid flaps extending upwardly therefrom, said flaps being configured to frictionally secure said shoe member to the bottom surface of said base; and clip means for further securing said shoe member to said base.

* * * * *